United States Patent Office 2,850,872
Patented Sept. 9, 1958

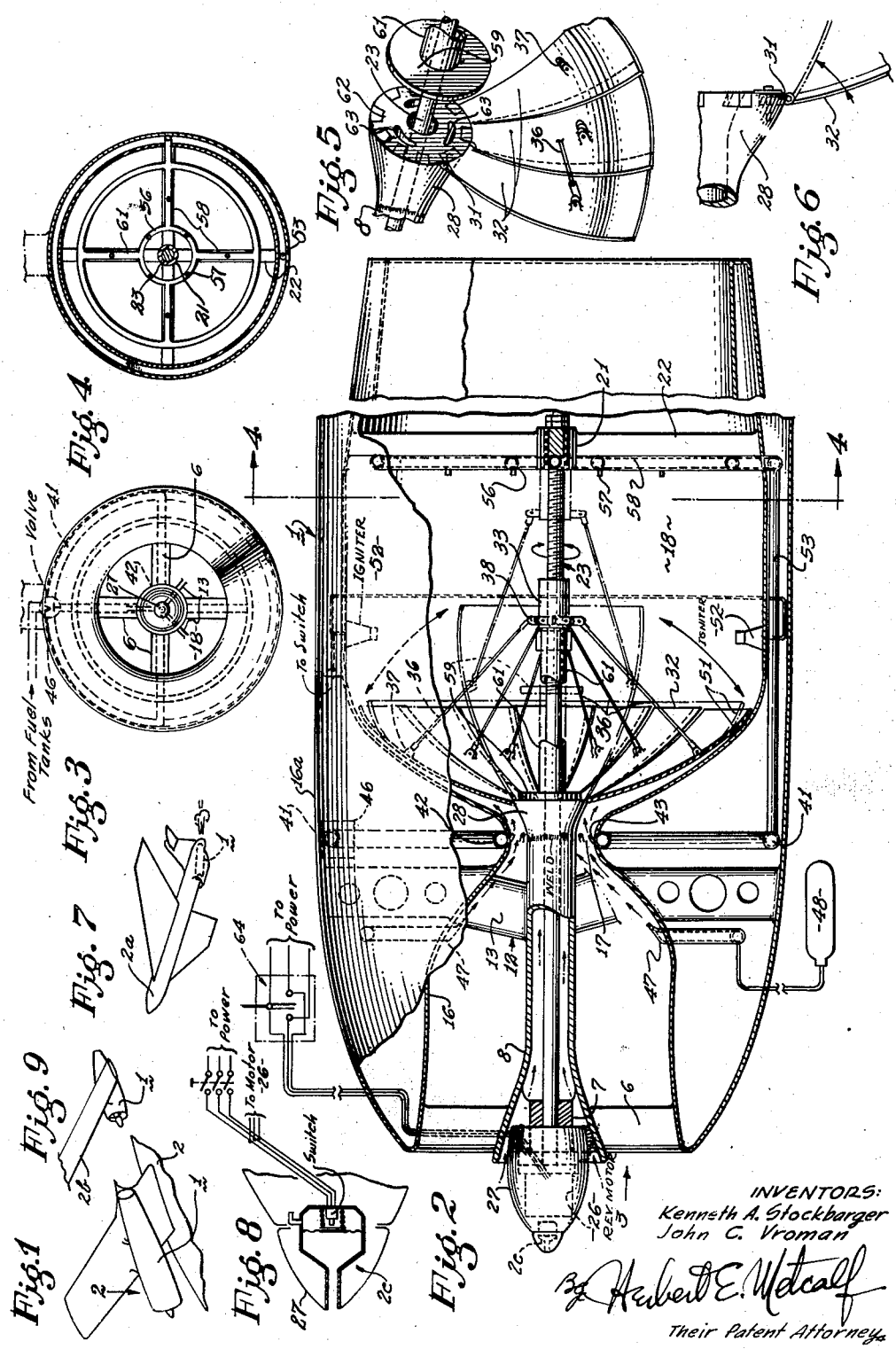

2,850,872

PULSE JET CONVERTIBLE TO RAM JET ENGINE

Kenton A. Stockbarger, Fullerton, and John C. Vroman, Hawthorne, Calif., assignors to Northrop Aircraft, Inc., Hawthorne, Calif., a corporation of California Application April 12, 1954, Serial No. 422,358

24 Claims. (Cl. 60—35.6)

Our invention relates to the field of jet propelled engines and more particularly to a new and novel combination jet engine having a pulse and ram phase of operation.

Both pulse and ram jet engines are compressorless engines which require that the air to be mixed with the fuel be placed under compression by either sucking the air into the vacuum left by the preceding blast or by ramming the air through the engine. Inasmuch as a ram engine requires to be moving through the air at high speeds before the engine will function as such, it is necessary to bring the engine up to this speed by other means. Some aircraft driven by ram-jet engines are launched by rockets, for example, others are dropped from a mother plane traveling at high speeds and altitudes.

It has long been the desire of the aircraft industry to find a means for launching a plane under its own power and then to bring the plane up to proper speed for the employment of a ram-jet engine without the necessity of having two separate types of engine within the plane.

Therefore, it is a principal object of my invention to provide a novel jet engine having pulse and ram operation phases.

A more specific object of my invention is to provide a jet engine which is effective to launch an aircraft and bring the plane up to a speed where the ram effect of the air can be utilized by this engine to drive the plane at still greater speeds.

Briefly my invention, in one preferred form, contemplates the use in an aircraft of a pulse-jet engine which is capable of use as a ram-jet engine when the craft is at the proper speed necessary to run in a pure ram phase. Overlapping pivotally connected vanes attached by a mechanical linkage to a nut member are placed at the entrance of the combustion chamber and act as the fuel valves to the chamber. When the craft is moving at a high enough speed so that ram air may be employed, a mechanical drive shaft is actuated by the pilot which causes the nut member to be moved longitudinally in an aft direction, thus drawing the vanes in the same direction much in the manner of one closing an umbrella. In so doing, the air in front of the plane is rammed into the combustion chamber without any impediments.

Other objects and uses will manifest themselves in view of the subsequent disclosure.

Referring now to the drawings in which:

Figure 1 is a perspective view showing a preferred embodiment of the new engine attached to an aircraft.

Figure 2 is a fragmentary cross-sectional view of my invention as viewed in the direction of arrow 2 of Figure 1.

Figure 3 is a front elevational view of my invention, drawn on a smaller scale.

Figure 4 is a cross sectional view taken on the line 4—4 of Figure 2, drawn on a smaller scale.

Figure 5 is a perspective fragmentary view of the valve hinge head.

Figure 6 is a fragmentary cross-section side view of the valve hinge head.

Figure 7 is a perspective view showing the new engine attached to a missile.

Figure 8 is a fragmentary cross section on a larger scale of an airspeed responsive switch which may be substituted for the manually operated switch shown in Figure 2.

Figure 9 is a fragmentary perspective view showing the new engine attached to a helicopter blade.

Referring now to the drawings for a more detailed description of a preferred form of my invention, the new engine 1 is placed in an airplane 2, a missile 2a, or a helicopter blade 2b as shown in Figures 1, 7, and 9. A front support comprising four islands 6 positions and holds a first bearing 7 secured thereto. One end of a tubular member 8 has a flared forward end which surrounds the first bearing 7 while its other end is supported by an intermediate support comprising islands 13 formed in a Y-shape which are attached to the curved inner skin 16 of the engine 1. The inner skin 16 is formed to provide a venturi throat 17 as well as a combustion chamber 18. A second bearing 21 positioned and held securely by an aft support 22 is utilized to retain the aft end of a screw shaft 23 which extends through the tubular member 8 where its forward end is supported by the bearing 7. The shaft 23 may be rotated in either direction by a reversible electric motor 26. The motor 26 is held firmly in position by virtue of its attachment to the front support in a streamlined shell 27. Pivotally connected to a hinge head 28 at the aft end of the tubular member 8 is a series of overlapping segments or valve vanes 32 the end portions 51 of which are flexible. Threadably engaged about the screw shaft 23 towards the aft end thereof is a nut member 33. A plurality of links 36 are connected to lugs 37 (see Figure 5) on the valve vanes 32 and to the nut member 33 by lugs 38. A fuel pipe 41 is positioned adjacent the inner surface of the skin 16a substantially as shown in Figure 2 and communicates with a collector ring 42 provided with metering jets 43 which inject fuel into the venturi throat 17. A fuel intake valve 46 is provided in the usual manner. Blast jets 47 are provided for the initial blast of compressed air from tanks 48 against the outer extremities 51 of the vane valves 32. Ignitors 52, which operate cyclically, are disposed about the periphery of the combustion chamber 18, and are turned on and off as required by any suitable means. An additional fuel line 53 is provided for use when the engine 1 operates in the ram stage, and is similarly provided with a fuel collector ring 56 and metering jets 57. A flame holder 58 is formed on the islands 61.

When the engine of this invention is installed on a pilotless airplane 2a or the helicopter blade 2b, the cockpit switch is substituted by an airspeed responsive switch 2c of any suitable type, for instance as shown in Figure 8, arranged at the forward end of the shell 27.

Attached to the nut member 33 is a valve element which in the instant embodiment constitutes a disk 59. The disk surrounds the screw shaft 23 and is spaced from the member 33 by means of a sleeve 61. Accordingly as the nut member 33 is moved in an axial direction with respect to the shaft 23 the disk 59 will also be moved an equal amount. During such times as the engine is functioning on the pulse-jet principle the disk 59 is in contact with the annular portion 62 of the member 28 effectively closing a plurality of apertures 63 formed therein. At such times as the engine is functioning on the ram-jet principle the disk 59 is removed from the annular portion 62 as shown in dotted lines in Figure 2, thereby allowing ram air to flow through the annular member 8 for a purpose which will be explained presently.

The operation of my invention in view of the structural recitation now follows. When the engine 1 is initially started the circuit to the ignitors 52 is closed causing the ignitors to fire, simultaneously air under pressure from the compression tanks 48 is injected in the directions indicated by the arrows in Figure 2. Fuel is metered in the venturi throat 17 and mixes with the compressed air which is directed to the extremities 51 of the vanes 32. The extremities 51 are thus caused to bend about the lugs 37 permitting the air-fuel mixture to enter the combustion chamber 18 where it will be exploded by the ignitors 52. The majority of the resulting gases will go rearwardly to urge the plane 2 forward, while a sufficient quantity will go forward, thus forcing the extremities 51 of the vane valves 32 against the inner skin 16. Due to the difference in pressure on opposite sides of the vanes 32 resulting from the vacuum created in the combustion chamber 18 the vanes 32 remain shut only momentarily. Air is caused to be sucked into the engine 1 through the forward opening and is then mixed with fuel meter from the jets 43. The air-fuel mixture will flow into the chamber 18 through the vane extremities 51 and will then be ignited by the heat of the previous explosion. The ignitors 52 are automatically turned off when the chamber 18 is heated from the initial explosion. This pulse-jet phase of the engine 1 continues until the plane 2 attains a predetermined speed at which time the engine 1 will be ready for the ram phase. A switch 64 is turned on by the pilot, for example, which actuates the motor 26. The screw drive shaft 23 attached to the motor 26 is actuated in a rotary fashion causing the nut member 33 to be translated rearwardly. The nut member however does not rotate. The links 36 which are connected to both the member 33 and the segmented vanes 32 similarly move rearwardly, in turn forcing the vanes 32 inwardly towards the chamber 18, much in the fashion of an umbrella being closed. With the vanes 32 in their lowered position, as shown in broken lines in Figure 2, air ahead of the plane 2 is rammed into the venturi throat 17 and past the metering jets 43. Here it forms an admixture of fuel and compressed air which flows into the combustion chamber where it is ignited. In the ram stage, fuel is caused to flow in line 53 into the collector ring 56 and is injected into the chamber 18 by the metering jets 57. A flame holder 58 is provided to insure that a portion of the flame from the preceding explosion will be available to ignite the combustible charge admitted into the chamber 18. The engine 1 may be switched back to the pulse jet stage, as the speed of the plane 2 is lowered, by causing the motor 26 to be operated in a reverse direction and continued until the member 33 is back to its initial position with the segmented vanes 32 having their extremities 51 closed against the skin 16.

As previously mentioned the disk 59 is attached to and moves with the nut member 33. Accordingly the disk is spaced from the annular portion 62 of the member 8 at such times as the engine is functioning on the ramjet principle. During this phase of the engine's operation ram air will flow through the member 8 and enter the combustion chamber 18. This air stream will be effectively distributed upon contacting the spaced disk 59. This air will cool the head 28 and also the vanes 32 after being deflected and diffused by the disk 59. This air also provides a better flame front within the combustion chamber 18 and additional air for combustion purposes.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. A jet engine operable sequentially with speed as a pulse jet and a ram jet and having an elongated body defining an air flow path therethrough with a plurality of valves arranged in the air flow path, including: means for injecting fuel together with air upstream of said valves when the engine is operating as a pulse jet; means for introducing additional air and fuel downstream from said valves when the engine is operating as a ram jet; said valves constituting segmented overlapping vanes; and means for positively moving said valves to increase the cross-sectional area of the path for air and fuel entering the combustion space of the engine when the latter is operating as a ram jet.

2. Apparatus in accordance with claim 1 further characterized by the fact that said removing means comprises: driving means extending through the forward and rearward portions of said body; retaining means to which said segmented vanes are pivotally connected, and opening means cooperative with said retaining means to effectively remove said vanes from said air flow path when said opening means are actuated by said driving means.

3. Apparatus in accordance with claim 2 further characterized by the fact that said driving means is a shaft which is threaded at one end thereof; said opening means comprising a nut member threadably engaged with said driving means and longitudinally movable thereon when said driving means is actuated; and link members secured at one end to said segmented vanes and at the other end thereof to said nut member.

4. Apparatus in accordance with claim 3 further characterized by means for supporting said driving means and means for actuating said driving means.

5. Apparatus in accordance with claim 4 further characterized by the fact that said forward and rearward portions of said elongated body are formed to define a venturi throat section intermediate said portions.

6. Apparatus in accordance with claim 5 further characterized by compressed air means so connected as to cooperate with said fuel injection means during the initial pulse stages of said engine.

7. A jet engine operable sequentially with speed as a pulse jet and ram jet comprising: an elongated body having means defining an air flow path therethrough in which air enters the forward and is exhausted from the rearward portion of said body during the forward motion of said craft, said portions formed to define a venturi throat section intermediate the respective portions; shaft driving means extending through said forward and rearward sections; a plurality of pulse jet valves disposed within said air flow path; means for effectively removing said valves from said air flow path after said craft has reached a predetermined airspeed to cause said engine to act as a ram jet, said removing means connected to and actuated by said shaft driving means; and means for injecting fuel upstream of said pulse valves to cause said engine to operate as a pulse jet.

8. Apparatus in accordance with claim 7 further characterized by the fact that said pulse jet valves are segmented overlapping vanes.

9. Apparatus in accordance with claim 8 further characterized by including a valve hinge head disposed downstream with respect to said venturi throat, said segmented vanes being secured to said valve hinge head.

10. Apparatus in accordance with claim 9 further characterized by said removing means comprising a nut member threadably engaged with said shaft driving means, said nut member having lugs thereon, and link members secured at one end to the lugs on said nut member and at the other end to said segmented vanes.

11. Apparatus in accordance with claim 10 further characterized by the fact that said means for injecting fuel comprises: fuel lines connectable to a fuel tank; fuel metering jets connected to said fuel lines and disposed about the venturi throat section of said engine; and air metering jets for injecting a stream of compressed air from air compression tanks into the fuel injected into said throat section, said mixture of fuel and air being directed to the outer extremities of said segmented vanes on the actuation of said engine.

12. A jet engine operable sequentially with speed as a pulse jet and ram jet comprising: an elongated body having means defining a first air flow path therethrough during forward motion of said craft in which air enters through the forward and is exhausted through the rearward portions of said body, said portions formed to define a venturi throat section intermediate the respective portions; shaft driving means extending through said forward and rearward sections; means for actuating said shaft driving means, said actuating means secured to said body; means for supporting said shaft driving means in position, said supporting means secured to said body; a plurality of pulse jet valves disposed within said first air flow path; means for effectively removing said valves from said first air flow path after said craft has reached a predetermined airspeed to cause said engine to act as a ram jet, said removing means connected to and actuated by said shaft driving means; and means for injecting fuel upstream of said pulse valves to cause said engine to operate as a pulse jet.

13. Apparatus in accordance with claim 12 further characterized by the fact that said valves are flexible segmented vanes.

14. Apparatus in accordance with claim 13 further characterized by a valve hinge head disposed around said shaft driving means, said vanes being pivotally connected at their apex to said hinge head.

15. Apparatus in accordance with claim 14 further characterized by a nut member being threadably engaged with said shaft driving means in the rearward portion of said body; a plurality of rigid links connected at one end to said nut member and at the other end to said vanes near the outer extremities thereof, said nut member and links effectively removing said vanes from the said first air flow path when actuated by said driving means; and a motor connected to said driving means at the forward end of said elongated body.

16. Apparatus in accordance with claim 15 further characterized by fuel metering jets disposed around the venturi throat section; air fuel jets for injecting compressed air into said throat section, said air jets effective to cause the resulting air-fuel mixture to impinge against the extremities of said flexible vanes when the latter are in their pulse stage position; and igniting means for igniting the fuel-air mixture in said rearward portion of said engine.

17. Apparatus in accordance with claim 16 further characterized by including a tubular member defining a second air flow path between the said forward and rearward portions of said body; and valve means adapted to block or allow air flow through said tubular member at such times as said engine is functioning as a pulse jet or ram jet, respectively.

18. Apparatus in accordance with claim 16 further characterized by including a tubular member defining a second air flow path between the said forward and rearward portions of said body; and separate valve means acting against the downstream end of said tubular member adapted to block or allow air flow through said tubular member at such times as said engine is functioning as a pulse jet or ram jet, respectively.

19. Apparatus in accordance with claim 18 further characterized by said valve means comprising a disk secured to said nut member and being longitudinally movable thereby between a closing and a spaced relationship with respect to said tubular member.

20. A jet engine comprising: an elongated body defining an air flow path therethrough; a plurality of pulse jet valves formed as segmented overlapping vanes disposed within said air flow path; means for injecting fuel upstream of said pulse jet valves to cause said engine to operate as a pulse jet; removal means including driving means extending through the forward and rearward portions of said body, retaining means to which said segmented vanes are pivotally connected, and opening means cooperative with said retaining means to effectively remove said vanes from said air flow path when said opening means are actuated by said driving means to cause said engine to operate as a ram jet; and a flame holder for retaining a portion of the flame during said ram stage.

21. Apparatus in accordance with claim 20 further characterized by the fact that said driving means is a shaft which is threaded at one end thereof; said opening means comprising a nut member threadably engaged with said driving means and longitudinally movable thereon when said driving means is actuated; and link members secured at one end to said segmented vanes and at the other end thereof to said nut member.

22. Apparatus in accordance with claim 21 further characterized by means for supporting said driving means and means for actuating said driving means.

23. Apparatus in accordance with claim 22 further characterized by the fact that said forward and rearward portions of said elongated body are formed to define a venturi throat section intermediate said portions.

24. Apparatus in accordance with claim 23 further characterized by compressed air means so connected as to cooperate with said fuel injection means during the initial pulse stages of said engine.

References Cited in the file of this patent

UNITED STATES PATENTS

| | | |
|---|---|---|
| 2,508,420 | Redding | May 23, 1950 |
| 2,635,421 | Blum | Apr. 21, 1953 |
| 2,677,232 | Collins | May 4, 1954 |
| 2,745,248 | Winter et al. | May 15, 1956 |